May 1, 1945.  D. R. SHOULTS  2,374,708
CONTROL SYSTEM FOR AIRCRAFT TURBOSUPERCHARGERS
Filed July 25, 1942  2 Sheets-Sheet 1
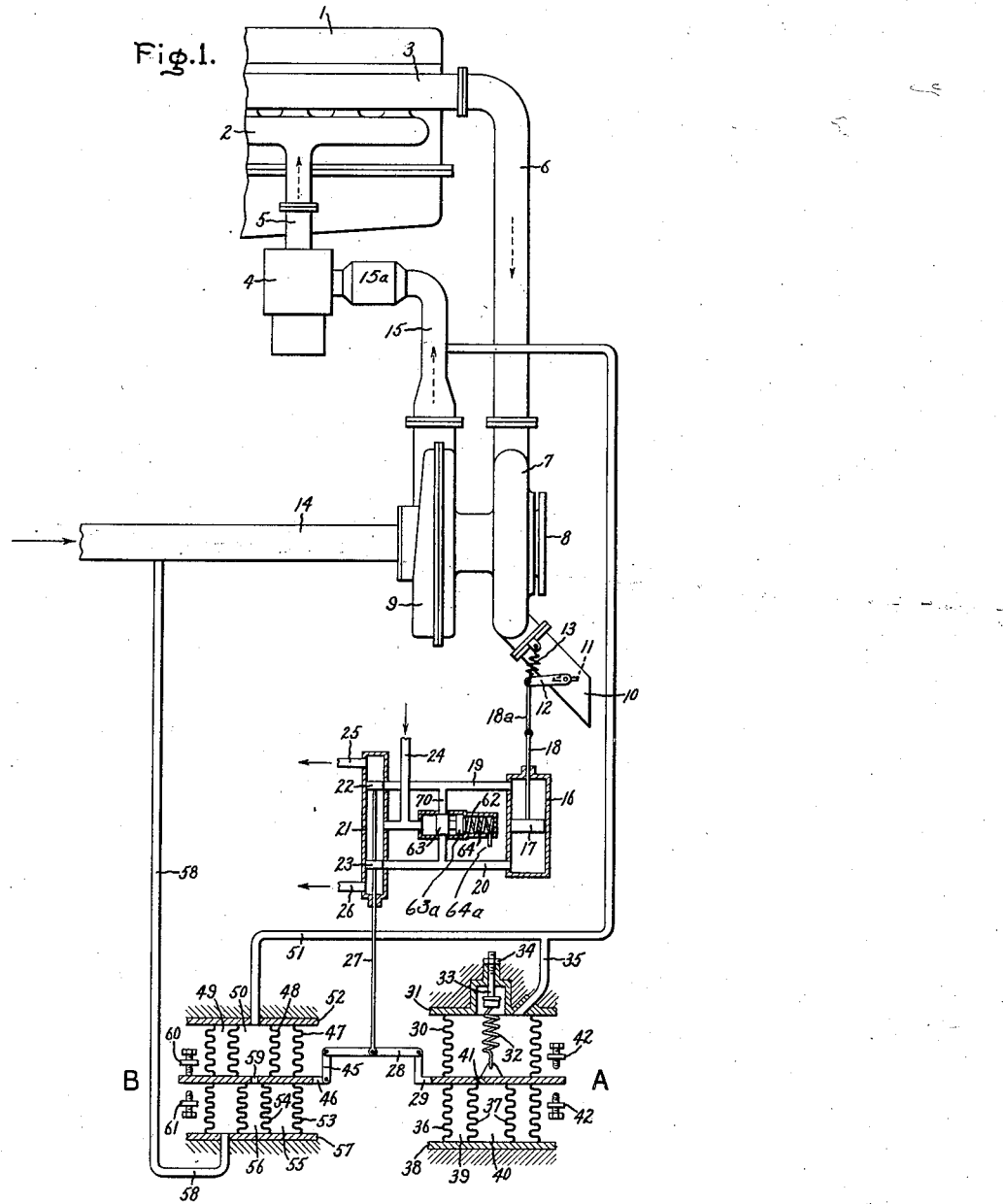
Inventor:
David R. Shoults,
by Harry E. Dunham
His Attorney.

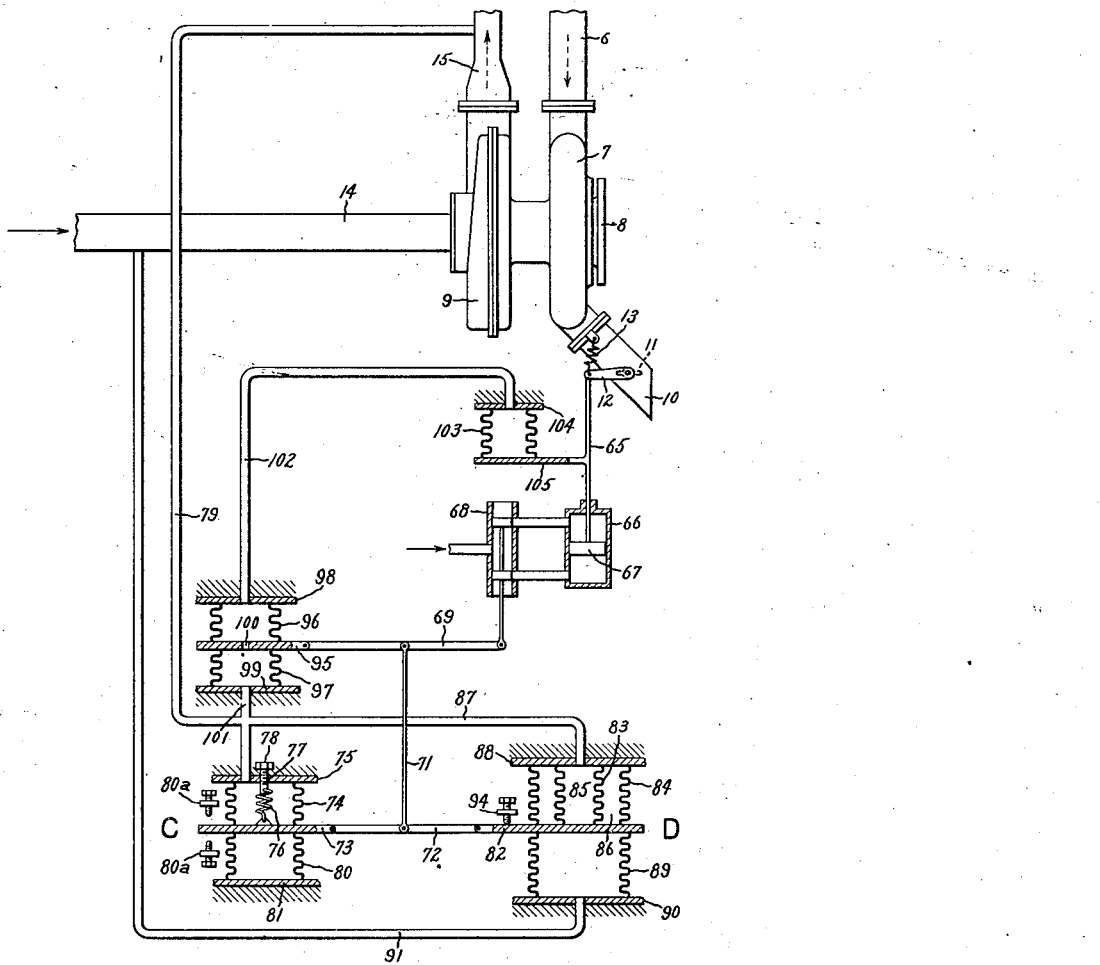

Patented May 1, 1945

2,374,708

UNITED STATES PATENT OFFICE 2,374,708

CONTROL SYSTEM FOR AIRCRAFT TURBO-SUPERCHARGERS

David R. Shoults, Schenectady, N. Y., assignor to General Electric Company, a corporation of New York Application July 25, 1942, Serial No. 452,294

11 Claims. (Cl. 230—114)

The present invention relates to turbosuperchargers for aircraft and especially to turbosuperchargers wherein the turbosupercharger is operated by exhaust gases from an aircraft internal combustion engine and the air compressed by the turbosupercharger is used to supercharge the engine. Turbosuperchargers of this type are regulated by controlling a waste gate valve which regulates the flow of exhaust gases from the internal combustion engine to the supercharger.

The object of my invention is to provide an improved control system for such turbosuperchargers, and for a consideration of what I believe to be novel and my invention, attention is directed to the following specification and to the claims appended thereto.

In the drawings, Fig. 1 is a diagrammatic view of a control system embodying the invention, and Fig. 2 is a similar view of a modification.

Referring to the drawings, 1 indicates an aircraft internal combustion engine having an intake manifold 2 and an exhaust manifold 3, and 4 indicates a carburetor having its outlet connected to the intake manifold by a conduit 5. Exhaust manifold 3 is connected by a conduit 6 to a nozzle box 7 of an exhaust gas-driven supercharger. The turbine wheel of the supercharger is indicated at 8 and the compressor at 9. Connected with nozzle box 7 is a waste conduit 10 in which is located an adjustable waste gate valve 11 used in regulating the turbosupercharger. On the shaft of valve 11 is fixed an arm 12 for use in positioning the valve and connected to arm 12 is a spring 13 which biases valve 11 to open position. Connected to the inlet of compressor 9 is an intake conduit 14 for conveying air from the slip stream of the aircraft, to the compressor. To this end, conduit 14 may be connected with a suitable ram (not shown) which faces into the slip stream of the aircraft. The discharge side of compressor 9 is connected by a conduit 15 to the inlet of carburetor 4. In conduit 15 is an intercooler 15a.

The arrangement so far described is a known one and is to be taken as typical of any suitable turbosupercharger installation. In operation, gases from the aircraft engine are supplied through conduit 6 to nozzle box 7 from which they are discharged through a ring of nozzles to turbine wheel 8 or through waste conduit 10 directly to atmosphere. When waste gate valve 11 is wide open, substantially all the exhaust gases discharge directly to atmosphere, little if any passing through the nozzles to the turbine wheel. This represents no load on the supercharger. As waste gate valve 11 is gradually closed, back pressure is built up in nozzle box 7, effecting a gradually increasing flow of exhaust gases through the nozzles to the turbine wheel to operate the supercharger. Maximum load on the supercharger is reached when waste gate valve 11 is fully closed so that all gases from the engine are discharged against the turbine wheel. Ordinarily, waste gate valve 11 is in an intermediate position, part of the exhaust gases being discharged to atmosphere and the remainder passing through the turbine wheel.

My invention has to do particularly with an improved means for regulating waste gate valve 11.

Waste gate valve 11 is positioned by a fluid motor comprising a cylinder 16 in which is located a piston 17 having its stem 18 pivotally connected to arm 12 by a link 18a. Connected with cylinder 16 on opposite sides of piston 17 by conduits 19 and 20 is a pilot valve comprising a casing 21 in which are located the pilot valve heads 22 and 23. Fluid pressure from any suitable source is supplied to the pilot valve by a conduit 24. The discharge pipes for the pilot valve are indicated at 25 and 26. The stem 27 of the pilot valve is pivotally connected to an intermediate point on a floating lever 28. One end of floating lever 28 is pivotally connected to a movable abutment 29 of a regulator member A which is responsive to the absolute pressure of the air supplied by the supercharger to the carburetor, i. e., to the discharge pressure of the supercharger. The regulator comprises a flexible bellows 30 which at one end is connected to movable abutment 29 and at the other end to a fixed head 31. Attached to movable abutment 29 is a tension spring 32, the upper end of which is attached to the inner end of a rod 33 which extends through head 31 and has a nut 34 on its outer end. By turning the nut 34, the tension of spring 32 may be adjusted. The interior of bellows 30 is subjected to a control pressure appurtenant to an operating condition of the supercharger and in terms of which it is desired to regulate the supercharger. The supercharger may be regulated, for example, in terms of speed, nozzle box pressure, torque, intake manifold pressure, or the like. In the present instance, the supercharger is shown as being regulated in terms of compressor discharge pressure (i. e., intake manifold pressure). To this end, the interior of bellows 30 is connected by a conduit 35 to the inlet of the carburetor, the connection being in advance of the carburetor throttle valve as regards the direction of the flow of air to the carburetor. Connected to the underside of movable abutment 29 are two concentric bellows 36 and 37, the lower ends of which are connected to a fixed head 38. Bellows 36 and 37 define two concentric spaces 39 and 40. The space 39 is evacuated and the space 40 is connected to the space inside bellows 30 by an opening 41 through movable abutment 29. Normally, the pressures inside bellows 30 and inside bellows 37 are equalized by reason of the opening 41 and since annular space 39 is evacuated, the regulator normally responds to the absolute pressure on the discharge side of the compressor. At 42 are adjustable stops for limiting the movement of abutment 29 in each direction.

The other end of floating lever 28 is connected by a link 45 to a movable abutment 46 of a second regulator member B which is arranged to be responsive to the ratio between the inlet and discharge pressures of compressor 9. Connected with the upper side of movable abutment 46 are two concentric bellows 47 and 48 which define concentric spaces 49 and 50. Space 49 is evacuated. Space 50 is connected by a conduit 51 to the carburetor inlet, the connection being in parallel with conduit 35. The upper ends of bellows 47 and 48 are each connected to a fixed head 52. Connected to the lower side of movable abutment 46 are two concentric bellows 53 and 54 which define concentric spaces 55 and 56. The lower ends of bellows 53 and 54 are connected with a fixed head 57. The space 55 is connected by a conduit 58 with the intake of compressor 9. Space 56 inside bellows 54 is connected with space 50 inside bellows 48 by an opening 59 through movable abutment 46. 60 and 61 are adjustable stops for limiting the movement of movable abutment 46 in each direction. Normally, the movable abutment rests against stop 60.

The pressures in spaces 50 and 56 are normally equalized by reason of the opening 59. Bellows 48 is larger in diameter than bellows 54 so that there is a differential area in space 50 upon which the pressure therein acts downwardly on movable abutment 46, such area being equal to the difference in area between bellows 48 and 54. In other words, there is an effective area comprising "area of space 50" minus "area of space 56" upon which the pressure on the discharge side of the compressor is applied to the abutment 46 in a downward direction. This is opposed by the absolute compressor intake pressure acting upwardly on abutment 46 over an area equal to the area of space 55. This "area 55" divided by "area 50 minus area 56" is the ratio of the areas which are subjected to the compressor inlet and discharge pressures. This ratio is made to have a value equal to the maximum ratio desired between the compressor inlet and discharge pressures.

In connection with the fluid motor, I preferably provide an arrangement whereby, in case the fluid pressure fails, the waste gate valve will be moved to wide open position. To this end, conduits 19 and 20 are connected by a by-pass conduit 70 in which is located a valve casing 62 provided with a valve head 63 normally biased toward the left hand end of the casing by a spring 64. The left hand end of the valve casing is in the form of a cylinder in which valve head 63 moves and which is connected with the source of fluid pressure 24. Normally, the fluid pressure in conduit 24 holds valve head 63 in the position shown in the drawing wherein by-pass 70 is closed. If the fluid pressure fails, spring 64 will move valve head 63 toward the left, thus connecting conduits 19 and 20 directly together through conduit 70. Thus, the opposite sides of cylinder 16 are directly connected together, permitting spring 13 to move waste gate valve 11 to its wide open position. At 63$^a$ is a pressure-equalizing piston head for balancing the pressure on the adjacent face of head 63 and at 64$^a$ is a drain pipe for draining fluid pressure from casing 62.

The operation is as follows. Assume that the aircraft is in the air and is flying at an altitude lower than the critical altitude of the supercharger, i. e., at an altitude below the maximum for which the supercharger is designed to maintain a predetermined pressure on the discharge side of the compressor, for example, sea level pressure. Also assume that at such altitude, waste gate valve 11 is in a partially closed position and the supercharger is operating at a speed such that the desired pressure obtains on the discharge side of the supercharger. Under these conditions, waste gate valve 11 will be under the direct control of regulator member A, the movable abutment of regulator member B being in engagement with stop 60. If now the pressure on the discharge side of compressor 9 increases, movable abutment 29 will be lowered against the action of spring 32 thus lowering the pilot valve to admit fluid pressure beneath piston 17, thus raising the piston and opening somewhat waste gate valve 11 to decrease the speed of the supercharger and bring the pressure back to normal. On the other hand, if the pressure on the discharge side of the compressor decreases, then spring 32 will effect an upward movement of abutment 29, thus raising the pilot valve to admit fluid pressure to the upper end of cylinder 16, thus lowering piston 17 to move waste gate valve 11 toward closed position whereby the speed of the supercharger is increased to bring the pressure back to normal.

It will be noted that bellows 30 is connected to the carburetor inlet and hence responds to changes in pressure on the discharge side of the compressor while the control of the supercharger is effected by adjusting waste gate valve 11. To effect stable operation, I provide means whereby the control member A comprising bellows 30 responds to rate of change of carburetor inlet pressure. This means comprises the pressure equalizing space 40 connected with the interior of bellows 30 by opening 41. When a change in pressure takes place at the carburetor inlet, it is transmitted to the interior of bellows 30, acting on movable abutment 29. The effect of such change in pressure on the movable abutment is to some extent counteracted or modified by reason of leakage through opening 41, the amount depending upon the rate of change in pressure. With a slow rate of change in pressure at the carburetor inlet, a larger proportion of the change is counteracted by reason of leakage through opening 41 than is the case with a more rapid rate of change. Thus, a more rapid rate of change produces a more rapid and greater movement of the regulating valve 11 than does a slower rate of change.

The effective pressure on abutment 29 tending to cause it to move is area of bellows 30 multiplied by the pressure, $P_1$, in bellows 30 minus the area of bellows 37 multiplied by the pressure, $P_2$, in space 40 inside bellows 37. This effective pressure is opposed by spring 32. Normally, $P_1$ and $P_2$ are equal and with a slow rate of change, they may remain equal due to the equalizing effect of opening 41. However, with a more rapid rate of change, $P_1$ and $P_2$ become temporarily unequal, the leakage through opening 41 being then not sufficiently rapid to equalize them with the result that the effective force tending to move abutment 29 is greater thus producing a greater and more rapid movement of the abutment.

The size of opening 41 and the area of bellows 40 are so chosen as to give the needed counteracting or modifying effect to provide stable governing.

The purpose of the control member B comprising movable abutment 46 is to take over control from the control member A comprising movable abutment 29 when the aircraft reaches critical supercharger altitude, (i. e., the maximum altitude for which the supercharger is designed) and to thereafter hold constant the ratio between compressor inlet pressure and compressor discharge pressure. Normally, movable abutment 46 stands against stop 60 and the control member A regulates the position of waste gate valve 11. When the ratio between the compressor outlet pressure and the compressor inlet pressure exceeds a predetermined high value, the total effective pressure on the upper side of abutment 46 becomes greater than that on the lower side whereupon abutment 46 moves downward away from stop 60 and the differential control member B takes the control away from the control member A and functions to hold a constant ratio of pressure across the supercharger compressor. If the ratio increases, abutment 46 is moved downward, lowering the pilot valve to effect an opening movement of waste gate valve 11 to lower the supercharger speed to bring the ratio back to the desired value, and vice versa. Similarly, in connection with the control member comprising movable abutment 46, I provide a counteracting or modifying means whereby the regulator responds to rate of change in the pressure ratio. This is effected by means of the counteracting or modifying bellows 54 and its connection with the interior of bellows 48 through opening 59, the operation being in substance the same as that already described in connection with control member A. With a slow rate of change in pressure ratio, a larger proportion of the change is counteracted by reason of escape of pressure through opening 59 than is the case with a more rapid rate of change. The size of opening 59 and the area of bellows 56 is chosen to give the needed counteracting or modifying effect to provide stable governing.

In Fig. 2 is shown another modification of my invention. The turbosupercharger may be the same as that shown in Fig. 1 and the same reference numerals have been applied to corresponding parts.

The arm 12 on the waste gate valve is connected to the stem 65 of a fluid actuated motor, the cylinder of which is indicated at 66, the piston at 67, and the pilot valve at 68. The stem of the pilot valve is pivotally connected to one end of a floating lever 69 which is pivotally connected by a link 71 to an intermediate point of a floating lever 72. The left hand end of lever 72 is pivotally connected to the movable abutment 73 of a regulator member C which is responsive to the absolute pressure of the air supplied by the supercharger to the carburetor, i. e., to the discharge pressure of the supercharger. The regulator member C comprises a flexible bellows 74 which at one end is connected to movable abutment 73 and at the other end to a fixed head 75. Attached to movable abutment 73 is a tension spring 76, the upper end of which is attached to the inner end of an adjustable stud 77 which extends through support 75 and has a nut 78 on its outer end. By turning the nut 78, the tension of spring 76 may be adjusted. The interior of bellows 74 is connected by a conduit 79 to the inlet of the carburetor, the connection being in advance of the carburetor throttle valve as regards direction of the flow of air to the carburetor. Connected to the under side of movable abutment 73 is a bellows 80, the lower end of which is connected to a fixed head 81. The space within bellows 80 is evacuated. With this arrangement, the regulator member C responds to the absolute pressure on the discharge side of the supercharger. At 80ª are adjustable stops for limiting the movement of abutment 73 in each direction.

The other end of floating lever 72 is pivotally connected to a movable abutment 82 of a second regulator member D which is arranged to be responsive to the ratio between the discharge and inlet pressures of compressor 9. Connected to the upper side of movable abutment 82 are two concentric bellows 83 and 84 which define concentric spaces 85 and 86. Space 86 is evacuated. Space 85 is connected by conduits 87 and 79 to the discharge side of compressor 9 to the carburetor inlet. The upper ends of bellows 83 and 84 are each connected to a fixed head 88. Connected to the lower side of movable abutment 82 is a bellows 89, the lower end of which is connected to a fixed abutment 90 and the interior of which is connected by a conduit 91 to the intake of compressor 9. At 94 is a stop for limiting the movement of abutment 82 in one direction. Normally, the movable abutment rests against stop 94. With the foregoing arrangement, abutment 82 is subjected on its under side to the compressor inlet pressure over an area equal to that of bellows 89 and it is subjected on its upper side to the pressure on the discharge side of the compressor over an area equal to the area of bellows 83. Thus, the regulator member D is responsive to the ratio between the discharge and inlet pressures of compressor 9 and when this ratio exceeds a predetermined value determined by the ratio between the area of bellows 83 and the area of bellows 89, movable abutment 82 will be moved downward away from stop 94.

The other end of floating lever 69 is pivotally connected to a movable abutment 95 located between two bellows 96 and 97 which are supported at their outer ends by fixed heads 98 and 99, respectively. In movable abutment 95 is a port 100 which connects the interiors of bellows 96 and 97. The interior of bellows 97 is connected by a conduit 101 to the discharge side of the compressor 9. The interior of bellows 96 is connected by a conduit 102 to the interior of a bellows 103 which at one end is supported by a fixed head 104 and at the other end is provided with a movable head 105 which is rigidly connected to stem 65 of the fluid actuated servo motor. Due to port 100, the interiors of bellows 97, 96 and 103 are all subjected to the pressure on the discharge side of compressor 9, and under normal conditions, the pressures in them are equalized.

The operation of the arrangement shown in Fig. 2 is as follows. Assume that the aircraft is in operation at an altitude lower than the critical altitude of the supercharger, that waste gate valve 11 is in a partially closed position, and that the supercharger is operating at a speed such that the desired pressure obtains on the discharge side of the supercharger. Under these conditions, waste gate valve 11 will be under the direct control of regulator member C, the movable abutment of regulator member D being in engagement with stop 94. If now the pressure on the discharge side of the supercharger increases, movable abutment 73 is moved downward, floating lever 72 pivoting around its right hand end. This lowers the pilot valve through the intermediary of link 71 and floating lever 69, admitting actuating fluid to the lower side of piston 67, thus raising the piston and opening somewhat waste gate valve 11 to effect a decrease in the speed of the supercharger to bring the pressure back to the desired value. In a similar way, if the pressure on the discharge side of compressor 9 decreases, the pilot valve is raised to admit fluid pressure above piston 67 to effect a movement of the waste gate valve toward closed position, thus increasing the speed of the supercharger to bring the pressure back to the desired value. Thus, the regulator member C operates in response to the absolute pressure on the discharge side of compressor 9 to regulate the waste gate valve to maintain such pressure constant.

Movable abutment 95 is a means responsive to the rate of change on the discharge side of compressor 9 which functions to stabilize the control. The interior of bellows 97 is subjected to the pressure on the discharge side of compressor 9 the same as is the interior of bellows 74, and a change in such discharge pressure tends to move abutment 95 the same as it tends to move abutment 73. An increase in pressure tends to move abutment 95 upward while a decrease in pressure tends to effect a movement of it downward. The extent to which abutment 95 is moved by such a change in pressure depends upon the rate at which the change in pressure takes place, this result being effected by port 100. If the rate of change is slow enough so that leakage through port 100 maintains the pressure on opposite sides of abutment 95 equalized, no movement of the abutment will take place. However, with a more rapid rate of change, the pressures on opposite sides of abutment 95 will become unequal, the amount of the unequalization and hence the amount of the movement of the abutment depending upon the rate of change.

Assume, for example, a rapid rate of increase in pressure on the discharge side of the compressor which calls for a rapid opening movement of waste gate valve 11. The increase in pressure effects a lowering of the left hand end of floating lever 72 which effects a downward movement of the pilot valve. At the same time, upward movement of movable abutment 95 similarly effects a downward movement by the pilot valve so that the movement of the pilot valve effected by abutment 73 is augmented by the movement effected by abutment 95, the latter movement depending upon the rate of change in the pressure. This effects a greater and more rapid movement of piston 67 to move waste gate valve 11 toward open position.

Similarly, a decrease in pressure on the discharge side of the compressor, which calls for a closing movement of waste gate valve 11, effects an upward movement of movable abutment 73, thus raising the pilot valve and at the same time effects a downward movement of movable abutment 95, augmenting the upward movement of the pilot valve. Upward movement of the pilot valve admits fluid pressure to cylinder 66 above piston 67, effecting a downward movement of piston 67 and a closing movement of waste gate valve 11. Again, the extent of the movement of abutment 95 depends upon the rate of change of the pressure on the discharge side of compressor 9 in the manner already explained.

The function of bellows 103 is to act as a follow-up or restoring mechanism for the pilot valve to prevent over-travel. Movement of piston 67 compresses or distends bellows 103, thus increasing or decreasing the pressure in bellows 103 and bellows 96 to effect movement of abutment 95 in one direction or the other. When piston 67 moves upward to open waste gate valve 11, it compresses bellows 103, thus increasing the pressure in the system comprising bellows 103, conduit 102 and bellows 96. This increase in pressure acts on abutment 95, lowering it and raising the pilot valve to restore it toward a position where the flow of actuating fluid in cylinder 66 is shut off. Similarly, a downward movement of piston 67 distends bellows 103, thus lowering the pressure in bellows 103 and bellows 96 to effect an upward movement of abutment 95 which in turn effects a lowering movement of the pilot valve to restore it toward normal position in which the flow of actuating fluid is cut off to the cylinder. In each case, the extent of the restoring action is dependent upon the rate of movement of piston 67 due to leakage through port 100 after the manner already explained.

When the ratio between the discharge pressure and the inlet pressure reaches a predetermined high value, the pressure on movable abutment 82 reaches a value such that the abutment is moved away from stop 94 whereupon the control member D, which corresponds to control member B of Fig. 1, and which operates in response to variations in ratio of the pressure across the compressor, taken control of the waste gate valve and functions to maintain constant the ratio of discharge pressure to inlet pressure of the compressor after the manner described in connection with Fig. 1. In connection with the operation of control member D, the rate of change device comprising movable abutment 95 and the follow-up or restoring device comprising bellows 103 functions in the manner already described in connection with control member C to cause the ratio control device D to function in accordance with the rate of change of the ratio.

By my invention, I am enabled to obtain close stabilized regulation of the turbosupercharger. At the same time my improved apparatus is simple in construction and reliable in operation.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. The combination with a turbosupercharger comprising a turbine adapted to be supplied with operating gases from an internal combustion engine, a compressor adapted to supply air to such an engine, and control valve means for the turbine, of control mechanism for said valve means comprising a movable abutment, means connecting the movable abutment to said valve means to effect regulating movements thereof, means subjecting said movable abutment to the pressure on the discharge side of said compressor, and means for accelerating the effective action of said pressure on said movable abutment responsive to rate of change of said pressure.

2. The combination with a turbosupercharger comprising a gas driven turbine, a compressor, and valve means for regulating the supply of gas to the turbosupercharger, of a control mechanism for said valve means comprising a movable abutment, means connecting the movable abutment to said valve means, means for subjecting the said movable abutment to a pressure appurtenant to an operating condition of the turbosupercharger to effect control movements of said movable abutment, and means for accelerating the effective action of said pressure on said movable abutment responsive to rate of change of said pressure.

3. The combination with a turbosupercharger comprising a turbine adapted to be supplied with operating gases from an internal combustion engine, a compressor adapted to supply air to such an engine, and control valve means for the turbine, of control mechanism for said valve means comprising a movable abutment, means connecting the movable abutment to said valve means to effect regulating movements thereof, means subjecting said movable abutment to the pressure on the discharge side of said compressor, a second movable abutment, means connecting said second movable abutment to said valve means to effect regulating movements thereof, means subjecting said second movable abutment to a pressure proportional to the ratio of the pressures on the discharge and inlet sides of the compressor, and means for accelerating the effective action of said pressures on said movable abutments responsive to rate of change of said discharge pressure and said pressure ratio, respectively.

4. The combination with a turbosupercharger comprising a gas driven turbine, a compressor and valve means for regulating the supply of gas to the turbosupercharger, of a control mechanism for said valve means comprising a movable abutment, means connecting the movable abutment to said valve means, means for subjecting said movable abutment to the pressure on the discharge side of the compressor to effect control movements of said movable abutment, and means for accelerating the effective action of said pressure on said movable abutment responsive to rate of charge of said discharge pressure.

5. The combination with a turbosupercharger comprising a gas driven turbine, a compressor and valve means for regulating the supply of gas to the turbosupercharger, of a control mechanism for said valve means comprising a movable abutment, means including a servo system having a pilot element for connecting the movable abutment to said valve means, means for subjecting the movable abutment to a pressure appurtenant to an operating condition of the turbosupercharger to effect control movements of said movable abutment, means for accelerating the effective action of said pressure on said movable abutment responsive to rate of change of said pressure, and restoring means for said pilot element actuated in response to movement of said valve means.

6. The combination with a turbosupercharger comprising a gas driven turbine, a compressor and valve means for regulating the supply of gas to the turbine, of control mechanism for said valve means comprising a servo-motor and pilot valve for moving the valve means, a movable member connected to the pilot valve, pressure means responsive to a pressure created by said turbosupercharger for effecting movement of said movable member, and pressure means actuated by movement of said servo-motor for setting up a pressure which effects a restoring movement of said pilot valve proportional to the rate of movement of said servo-motor.

7. In combination, a turbosupercharger adapted to be actuated by exhaust gases from an internal combustion engine, regulating means for the turbosupercharger, and means responsive to a pressure appurtenant to an operating condition of the turbosupercharger and to a pressure proportional to a rate of change of a pressure appurtenant to an operating condition of the turbosupercharger for positioning said regulating means.

8. In combination, a turbine driven compressor adapted to be actuated by exhaust gases from an internal combustion engine for supplying air to the engine, valve means for regulating the flow of exhaust gases to the turbine, and means directly responsive to the pressure on the discharge side of the compressor, to the ratio of the discharge and inlet pressures, and to the rate of change of said discharge pressure and said ratio for positioning said valve means.

9. In combination, a turbine driven compressor adapted to be actuated by exhaust gases from an internal combustion engine for supplying air to the engine, valve means for regulating the flow of exhaust gases to the turbine, and means responsive to the pressure on the discharge side of the compressor, to the ratio of discharge and inlet pressures, to the rate of change of said discharge pressure and said ratio and to the rate of movement of said valve means for positioning said valve means.

10. In combination, a turbine driven compressor adapted to be actuated by exhaust gases from an internal combustion engine for supplying air to the engine, valve means for regulating the flow of exhaust gases to the turbine, and regulating means for positioning said valve means comprising opposed movable abutment areas, means defining a restricted orifice connecting said areas, and means subjecting one of said areas to a regulating pressure appurtenant to an operating condition of said turbine driven compressor.

11. In combination, a turbine driven compressor adapted to be actuated by exhaust gases from an internal combustion engine for supplying air to the engine, valve means for regulating the flow of exhaust gases to the turbine, and means responsive to the pressure on the discharge side of the compressor, to the rate of change of said discharge pressure, and to the rate of movement of said valve means for positioning said valve means.

DAVID R. SHOULTS.